United States Patent
Bauchspies

(10) Patent No.: US 10,395,129 B2
(45) Date of Patent: Aug. 27, 2019

(54) DYNAMIC REGISTRATION SEED

(71) Applicant: IDEX ASA, Fornebu (NO)

(72) Inventor: Roger A. Bauchspies, Gustine, CA (US)

(73) Assignee: IDEX ASA, Fornebu (NO)

( * ) Notice: Subject to any disclaimer, the term of this patent is extended or adjusted under 35 U.S.C. 154(b) by 100 days.

(21) Appl. No.: 15/265,539

(22) Filed: Sep. 14, 2016

(65) Prior Publication Data
US 2018/0075310 A1    Mar. 15, 2018

(51) Int. Cl.
G06K 9/36 (2006.01)
G06K 9/62 (2006.01)
G06K 9/00 (2006.01)

(52) U.S. Cl.
CPC ..... *G06K 9/00926* (2013.01); *G06K 9/00026* (2013.01); *G06K 9/00087* (2013.01); *G06K 9/6256* (2013.01)

(58) Field of Classification Search
CPC ..................... G06K 9/00006–9/0012
See application file for complete search history.

(56) References Cited

U.S. PATENT DOCUMENTS

| | | | |
|---|---|---|---|
| 9,257,133 B1 | 2/2016 | Strand | |
| 9,471,765 B1* | 10/2016 | Setterberg | G06K 9/00026 |
| 2005/0185828 A1* | 8/2005 | Semba | G06K 9/00006 |
| | | | 382/124 |
| 2008/0212846 A1* | 9/2008 | Yamamoto | G06K 9/00087 |
| | | | 382/115 |
| 2014/0003681 A1* | 1/2014 | Wright | G06K 9/00013 |
| | | | 382/124 |
| 2016/0248769 A1 | 8/2016 | Han et al. | |
| 2016/0328596 A1* | 11/2016 | Midgren | G06F 21/32 |
| 2017/0004642 A1 | 1/2017 | Bauchspies | |
| 2017/0011540 A1 | 1/2017 | Bauchspies et al. | |
| 2017/0017829 A1 | 1/2017 | Bauchspies | |
| 2017/0200043 A1* | 7/2017 | Wu | G06K 9/00087 |
| 2017/0372049 A1* | 12/2017 | Tieu | G06F 21/36 |

OTHER PUBLICATIONS

International Search Report for PCT/EP2017/073186 dated Nov. 30, 2017.
Written Opinion of the International Searching Authority for PCT/EP2017/073186 dated Nov. 30, 2017.

\* cited by examiner

*Primary Examiner* — Brian Werner
(74) *Attorney, Agent, or Firm* — Kilpatrick Townsend & Stockton LLP

(57) ABSTRACT

A system, method, and computer program product for efficiently and securely evolving a pattern, such as a fingerprint representation, from a dynamic set of impressions responsive to a pattern-under-test which may be the pattern. The system may include two modes: 1) a trusted registration mode, and 2) a dynamic, semi-trusted, registration mode. In this context, the dynamic mode is semi-trusted in that it automatically employs trusted information to evaluate new, non-trusted input received from the pattern collection system and, in an event certain criteria are satisfied, this dynamic mode may gain automatic access to the trusted memory/trusted template. That the automatic access to the trusted template is conditional makes this dynamic mode semi-trusted. The trusted registration mode may include definition/production of a trusted template of trusted template elements in a trusted memory, at least one of the trusted template elements includes at least one evolvable seed.

26 Claims, 3 Drawing Sheets

DYNAMIC REGISTRATION SEED

CROSS REFERENCE TO RELATED APPLICATIONS

This application is related to, among others, U.S. patent application Ser. No. 15/192,099 filed 24 Jun. 2016, U.S. patent application Ser. No. 15/201,901 filed 5 Jul. 2016, and U.S. patent application Ser. No. 15/205,318 filed 8 Jul. 2016 the contents of which are hereby expressly incorporated by reference thereto in its entirety for all purposes.

FIELD OF THE INVENTION

The present invention relates generally to automated machine-implemented pattern processing, and more specifically, but not exclusively, to systems, methods, and computer program products for dynamically evolving one or more pattern seeds during operation to become trusted pattern representations, such as, for example, trusted pattern representations used in pattern verification systems, methods, and computer program products, including fingerprint verification systems.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Pattern verification, such as in a context of registration of a trusted fingerprint into a trusted memory of a fingerprint verification system, requires a sufficiently accurate and precise image of the trusted fingerprint (how accurate and how precise are dependent upon design considerations of a particular embodiment). This image may be obtained directly from an imaging sensor. This may be suitable for large area imaging sensors. However, for many applications, the trusted image is reconstituted from image portions of the trusted fingerprint taken from a sensor having a sensing area smaller than the final image. For many mobile applications and electronic platforms, such as smartphones and the like, the use of the small sensor provides a smaller form factor having a lower cost of goods which is important to implementation and adoption. However use of the smaller sensor impacts registration and user experiences during verification.

Any mobile electronic platform having a fingerprint verification system typically includes a registration system that establishes and writes one or more trusted images into a trusted database/memory. Test fingerprints are compared against the trusted image(s) using a matching engine that matches features of interest from the test fingerprint against features of interest from the trusted image(s). A quality of the test image and of the trusted images impact the user experience.

Many systems using a small area sensor therefore register a single finger using multiple impressions. An initial impression of an image portion always provides completely unique information of the larger image to be reconstituted. However, subsequent impressions have varying usefulness depending upon whether the user provides an impression that partially overlaps and partially presents new image data. The user has difficulties in placing a finger for multiple impressions to ensure only unique partial overlapping data is presented with each impression, particularly over a breadth of an entire fingerprint pattern. It is too easy for a user to provide subsequent images with too much overlap or with too little or no overlap. A user does not know when or if they have provided enough sufficiently overlapping image impressions that map enough of the total fingerprint to provide an end product that provides the user with an easy-to-use verification system.

From a perspective of a user, this can become very challenging as the sensor imaging area decreases. Registration systems may not provide feedback to the user of a status of the finger area mapping process. An accuracy of the registration process is degraded when the set of image portions are unable to produce the needed larger image.

Systems for processing image portions of a pattern may sometimes be desirably implemented using limited computing and memory resources. As an active area of a sensor decreases, a greater number of image portions are needed to cover any particular area of the pattern. Managing and processing multiple portions of a pattern can sometimes negatively impact performance, unless other systems and methods are implemented to counter this impact which may add additional complexity and costs.

In addition to these technical details, the initial registration into trusted memory has typically been performed after a device is initialized such as from a new purchase or a complete memory reset which clears trusted information from the trusted memory. At this time, there can be a tension between a user investing enough time to develop a sufficiently robust set of data in the trusted memory and actually using the device. For some users, they may skip this initial investment and never return to this procedure. The amount of time needed for the sufficiently robust set of data is at least partially implicated by use of small area sensors such that a time to develop the set of data may be longer than with a larger area sensor.

Dynamic registration may help address this concern. In a dynamic registration system, there may, or may not, be an initial trusted mode of collecting a limited set of trusted information with the knowledge that this limited set would typically be unsatisfactory over extended use (with security being either too open or too restrictive depending upon implementation). Then this initial trusted mode is followed by a dynamic non-trusted mode during which the user is actively using a fingerprint to unlock/enable the device. Therefore, as the user presents his finger for matching, the device may update the set of trusted information used to match the finger over time. The user need not be aware of this process running in the background of using their device. The dynamic registration mode does not necessarily have an end point and it may continue throughout the life of the device.

Unfortunately, such dynamic systems may expose the device and the user to security vulnerabilities as other people use the device, some of whom may have malicious intent. The dynamic system does not know which information from a fingerprint sensor is provided by the user, or know whether the information comes from the target finger of the user (the user may touch the sensor with different fingers). Such systems may employ various authentication systems to confirm that certain "dynamic information," that is information developed during dynamic mode, is authorized to be added into trusted memory. Unfortunately, for most users, they may not be sure of how to respond to a query about whether certain dynamic information should be added into trusted memory. They may not know which information was collected, from whom, and when the information was collected.

Further, any dynamic registration system that relies on a password for adding information into trusted memory may subject the fingerprint system to the vulnerabilities associated with passwords. For some users, fingerprint verification is often used to counter some problems with passwords, and having a password associated with the registration of dynamic information into trusted memory may effectively defeat benefits of having a fingerprint system.

What is needed is a system, method, and computer program for efficiently and securely evolving a pattern, such as a fingerprint representation, from a dynamic set of impressions from an impressioner collecting an input responsive to a pattern-under-test.

BRIEF SUMMARY OF THE INVENTION

Disclosed is a system, method, and computer program product for efficiently and securely evolving a pattern, such as a fingerprint representation, from a dynamic set of impressions from an impressioner collecting an input responsive to a pattern-under-test which may be the pattern. The following summary of the invention is provided to facilitate an understanding of some of the technical features related to evolving dynamically a pattern from a pattern source such as a finger, and is not intended to be a full description of the present invention. A full appreciation of the various aspects of the invention can be gained by taking the entire specification, claims, drawings, and abstract as a whole. The present invention is applicable to other patterns in addition to fingerprints, other pattern sources in addition to fingers, to other systems in addition to registration or verification systems, to systems that do not include a matching engine, and to a range of sensor sizes.

In an embodiment of the present invention, a pattern source (e.g., a finger) may include a pattern (e.g., a fingerprint). For a system that does not process the pattern (fingerprint) directly, the system may process a representation (e.g., a pattern map) of the pattern (fingerprint). When a user uses an impressioner (e.g., places a pattern source (finger) on a sensor or imager or other impression producing structure), the system may produce an impression (e.g., an image) of a portion of the pattern (fingerprint) of the pattern source (finger) of the user. Impressions (images) may be collected and evaluated, in bulk or in realtime or in near realtime depending upon a particular implementation.

In an embodiment, there may be two modes: 1) a trusted registration mode, and 2) a dynamic, semi-trusted, registration mode. In this context, the dynamic mode is semi-trusted in that it automatically employs trusted information to evaluate new, non-trusted input received from the pattern collection system and, in an event certain criteria are satisfied, this dynamic mode may gain automatic access to the trusted memory/trusted template. That the automatic access to the trusted template is conditional makes this dynamic mode semi-trusted. The trusted registration mode may include definition/production of a trusted template of trusted template elements in a trusted memory, at least one of the trusted template elements includes at least one evolvable seed. The dynamic registration mode may include evolution of the seed(s) selectively responsive to new impressions of a pattern that may be the pattern used in the dynamic registration mode, with evolved seeds included as a template element in the template in the trusted memory. There may be a wide range of considerations and implementation details regarding the selection and evolution of the one or more seeds, some of which are detailed herein.

In an embodiment, it may be possible to periodically register new seeds over time by re-entering into a trusted registration mode, either explicitly or implicitly based upon some set of conditions or criteria. The template with evolved template elements, may become quite specific to a user. It is the case that over time, and based upon different local conditions of the impressioner and the pattern to be impressioned, that variations in the impression will be found. A dynamic evolving system may be better able to accommodate short-term (e.g., a swollen finger) and long-term (e.g., a scar) variations in the pattern source.

In an embodiment, for some users, it may be desirable to employ their evolved template to new devices as the template serves as an accurate, customized, user certificate. Thus some embodiments may include an ability to transfer an evolved template to new devices operated by the particular user which may help to altogether avoid the problems with an initial template.

An embodiment may have an advantage over the existing solutions since it is less likely that the template will be corrupted by another person's finger, because the seed image information used to modify the template were captured during use in a trusted environment, rather than during "every day" use of the device.

An embodiment may be compatible with user cases where the initial trusted registration mode is carried out by connecting the device containing the fingerprint sensor to another intelligent system, for example: a) a bank card, a smart card or identity card containing a fingerprint sensor where trusted registration mode is carried out in a secure office with the card containing the fingerprint sensor possibly linked to a computer and supervised by an official, and b) a device containing a fingerprint sensor that does not have any kind of graphical user interface/screen/user feedback mechanism is connected to a computer/mobile phone/portable electronic device during trusted registration mode, among other possible uses.

A machine-implemented method for evolving a trusted template using a set of post-registration information, the trusted template including a set of trusted template elements defined from a pattern with the set of trusted template elements, the method including a) defining, during a trusted mode, a set of evolvable seeds from the pattern, the set of evolvable seeds including at least one evolvable seed; b) including the set of evolvable seeds in the set of trusted template elements; and c) evolving, during a semi-trusted mode, one or more evolvable seeds of the set of evolvable seeds responsive to the set of post-registration information.

An apparatus for evolving a trusted template using a set of post-registration information, the trusted template including a set of trusted template elements defined from a pattern with the set of trusted template elements used for a later verification of the pattern, including a pattern collector producing one or more of the impressions; and a processing system, coupled to the pattern collector, including a processor and a memory coupled to the processor, the memory storing a plurality of computer executable instructions wherein the processor executes the plurality of computer executable instructions to perform a method, including a) defining, during a trusted mode, a set of evolvable seeds from the pattern, the set of evolvable seeds including at least one evolvable seed; b) including the set of evolvable seeds in the set of trusted elements; and thereafter c) evolving, during a semi-trusted mode, one or more evolvable seeds of the set of evolvable seeds responsive to the set of post-registration information.

A non-transitory computer readable medium with computer executable instructions stored thereon executed by a processor to perform the method of dynamically evolving a trusted template using a set of post-registration information, the trusted template including a set of trusted template elements defined from a pattern with the set of trusted template elements used for verification of the pattern, the method including a) defining, during a trusted mode, a set of evolvable seeds from the pattern, the set of evolvable seeds including at least one evolvable seed; b) including the set of evolvable seeds in the set of trusted elements; and thereafter c) evolving, during a semi-trusted mode, one or more evolvable seeds of the set of evolvable seeds responsive to the set of post-registration information.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
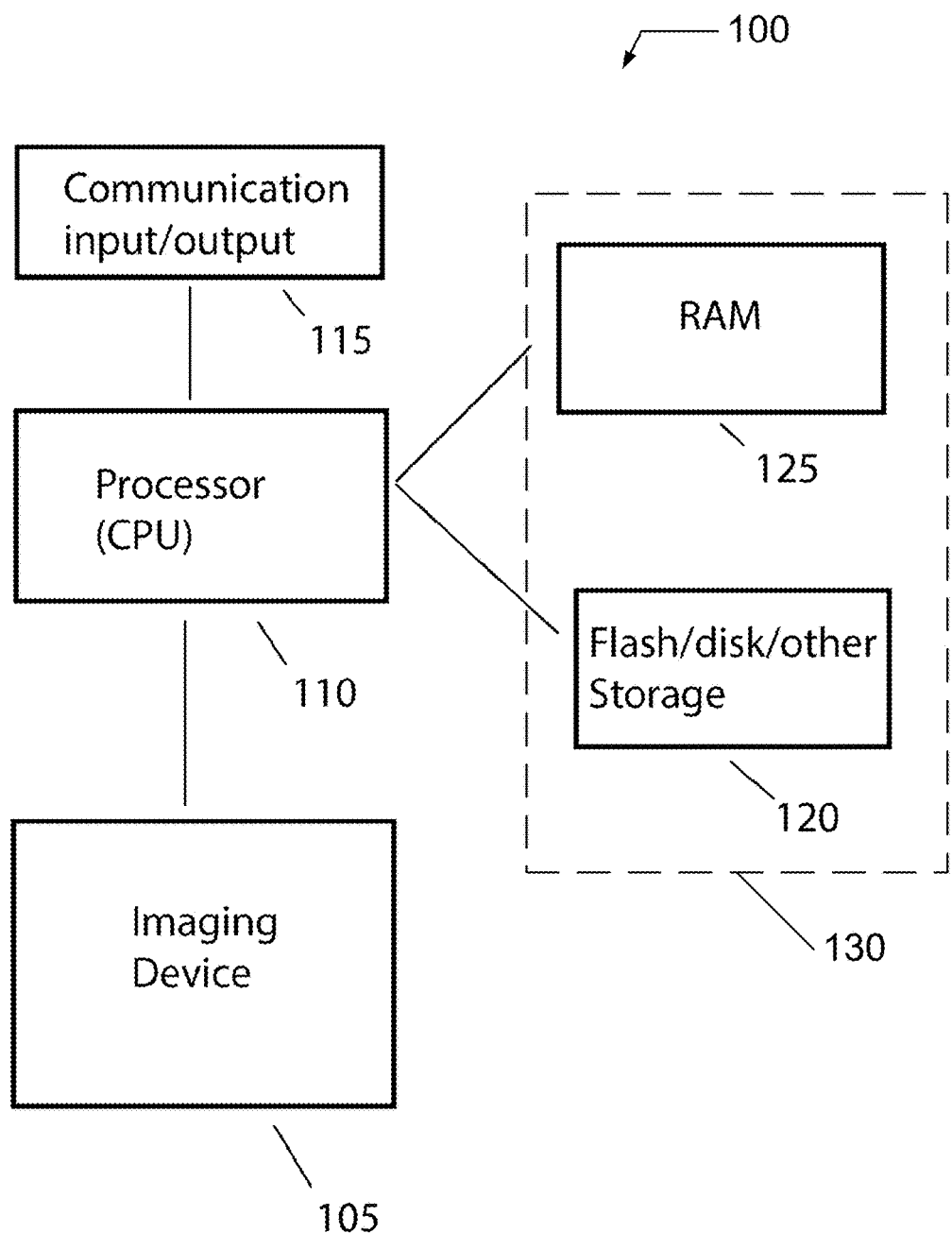
FIG. 1 illustrates a block schematic diagram of an embodiment for a pattern verification system.

Embodiments of the present invention provide a system, method, and computer program product for efficiently and securely evolving a pattern, such as a fingerprint representation, from a dynamic set of impressions from an impressioner collecting an input responsive to a pattern-under-test. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "fingerprint" means a map of contrasting amplitude elements from a pattern source. As such, a ridge/furrow pattern on a human finger is included as a fingerprint. Additionally, zebra stripe patterns, retinal vein patterns, or other collections of contrasting amplitude elements having a set of a plurality of sufficiently long succession of similarly contrasted elements.

As used herein, the terms "match," "matching," and "matches" refer to a conclusion of a comparison of a first pattern (e.g., a first image portion of a first impression from a sensor) against a second pattern (e.g., a second image portion of a second impression from the sensor) that means that a pattern source used in the first impression is the same pattern source, within a sufficient confidence interval appropriate to the application, used in the second impression. A match does not require 100% commonality of features between the first and second patterns. One hundred percent, and nearly 100% (for example 95% commonality—depending upon application), commonality is referred to as a duplicate image. This results when the user places the same portion of the same finger on the sensor from two or more impressions. Sometimes a match is a determination from a matcher process or matcher engine, which can have a particular special meaning. Some embodiments of the present invention include just such a matcher process. However, the present invention is not constrained to determining matches in this fashion; the present invention includes use of an alignment engine for evaluating the condition of a match or a non-match between comparisons of a set of patterns.

As used herein, the terms "correlate," "correlating," and "correlated" refer to a conclusion of a comparison of a first pattern (e.g., a first image portion of a first impression from a sensor) against a second pattern (e.g., a second image portion of a second impression from the sensor) that means that a pattern source used in the first impression is the same pattern source, within a sufficient confidence interval appropriate to the application, used in the second impression without a match between the first pattern and the second pattern. Correlation is found by matching intermediate patterns that provide a bridge between the first pattern and the second pattern. For example, a second pattern may not match the first pattern, but may match a third pattern, with the third pattern matching the first pattern. Correlation may be found by one or more intermediate matches between the second pattern and the first pattern.

As used herein, the terms "near realtime" refers to a practicality of a time delay introduced, by automated data processing or data transmission, between an occurrence of an event of receiving a pattern impression from application of a pattern source to a pattern impressioner (e.g., an imager to create a bitmap image of a portion of a pattern associated the pattern source) and the subsequent processing of data for that pattern impression (e.g., a bitmap image), such as for display, feedback, or control purposes. Depending upon a processing speed, it may be possible to make multiple pattern impressions before a first pattern impression is processed. Some embodiments of the present invention process serial pattern impressions from a user in realtime or near realtime which may be considered equivalent when the processing delay is imperceptible to a user. For realtime, and near realtime embodiments, it is considered that pattern impressions are taken and processed serially, that is an impression and processing/feedback is provided before a next following pattern impression is processed.

In general, a pattern source (e.g., a finger) may include a pattern (e.g., a fingerprint). For a system that does not process the pattern (fingerprint) directly, the system may process a representation (e.g., a pattern map) of the pattern (fingerprint). When a user uses an impressioner (e.g., places a pattern source (finger) on a sensor or imager or other impression producing structure), the system may produce an impression (e.g., an image) of a portion of the pattern (fingerprint) of the pattern source (finger) of the user. After registration during operation when receiving pattern information, the system and method may not, and typically does not, have a priori knowledge that an incoming set of pattern information is in fact from the pattern. To reflect this, any pattern providing the incoming set of pattern information may be referred to as a pattern-under-test. Impressions (images) may be collected and evaluated, in bulk or in realtime or in near realtime from one or more patterns-under-test depending upon a particular implementation. There may be two modes: 1) a trusted registration mode, and 2) a dynamic (semi-trusted) registration mode. The trusted registration mode may include definition/production of a trusted template of trusted template elements in a trusted memory, at least one of the trusted template elements includes at least one evolvable seed which ideally are all from a desired to-be-trusted pattern. The dynamic registration mode may include evolution of the seed(s) selectively responsive to new impressions derived from a pattern-under-test that may be the pattern used in the dynamic registration mode, with evolved seeds included as a template element in the template in the trusted memory. Part of an evolution process may include development of suitable confidence that evolvable seeds are evolved when the pattern-under-test corresponds sufficiently (e.g., matches and/or correlates to pattern information) to the trusted pattern. There may be a wide range of considerations and implementation details regarding the selection and evolution of the one or more seeds, some of which are detailed herein. Trusted mode thus refers to an assumption by the system that pattern information it is processing is, in fact, the trusted pattern. Non-trusted mode historically has been other processings of pattern information from a pattern-under-test that may be the trusted pattern. Semi-trusted mode is a hybrid mode in which received pattern information is treated as coming from the trusted pattern when an evaluation of the received pattern information against template element information provides a suitable degree of matching or correlating. Thus in some embodiments it may be possible to trust a particular set of received pattern information enough to evolve one or more evolvable seeds but the received pattern information may not otherwise match against the template itself. As the seeds evolve this condition may become less common particularly when the evolvable seeds are evolved using pattern information from the actual trusted pattern. Thus this pattern information is semi-trusted.

To help simplify the discussion, the following description has a general focus of semi-trusted dynamic registration using evolving seeds from a portion of a representation of fingerprint using qualified bitmap images developed from a fingerprint sensor. During use of a device associated with the sensor, images of portions of a fingerprint used in verification may be selectively used to evolve one or more evolvable seeds which are also part of the verification template used in the future to verify new images of portions of fingerprint-under-test. Different implementations may vary the number of initial evolvable seeds, how seeds are selected and evolved dynamically during use, whether new evolvable seeds are added to the template, whether evolved seeds become marked as non-evolving, among other variations. This focus is not intended to limit the scope of the present invention to such systems, methods, and computer program products but is intended to help understand the present invention by use of a specific implementation.

FIG. 1 illustrates a block schematic diagram of an embodiment for a pattern registration system 100. System 100 includes an imaging device 105, a processor 110, an input/output (I/O) system 115, a nonvolatile memory 120 and a RAM memory 125, with memory 120 and memory 125 collectively defining a memory system 130. System 100 is described, in the disclosed embodiment, as a fingerprint registration system that may be used as a pattern (e.g., fingerprint) verification system. In a fingerprint verification system, the system attempts to measure a correspondence between a pair of fingerprints (one-on-one) in order to establish, within some level of confidence, whether one pattern source (a finger) is the same or sufficiently close to another pattern source (a finger) that produces the other fingerprint. This is contrasted with an identification system that determines which pattern source (which finger belonging to which person) generated a particular fingerprint. A verification system may be used as an identification system when a decrease in power/speed is acceptable, given fixed resources. A verification system performs better as the quality of the registered images improves.

System 100 may function as a basic computer in implementing the present invention for accessing and processing fingerprints, fingerprint images, and sets of curves derived from a fingerprint as further described below. Processor 110 may include one or more central processing units (CPUs), selected from one or more of an x86, x64, ARM, or the like, architectures, connected to various other components, such as by a system bus.

Imaging device 105 produces an image of a fingerprint (an impression from an impressioner for example); either directly (e.g., it is a sensor or imager for a pattern source or an artifact from a pattern source) or it accesses a data structure or memory to obtain the image. The image may be of all or a portion of an entire fingerprint. Sometimes a portion of a fingerprint image may appear to be a set of discrete curves. System 100 is a computing system (e.g., an embedded computing system, a general purpose computing system, a special purpose computing system, combinations thereof, including a stored program computing platform with a processor and a coupled memory storing executable instructions) having a large number of suitable implementations for accessing and processing resources fingerprints, fingerprint images, portions of fingerprint images, and sets of curves derived from a fingerprint. Sensors that may be used with system 100 include charge-coupled devices (CCD), complementary metal oxide semiconductor (CMOS), capacitive, thermal, optical, electro-optical, RF modulation, acoustic, or other image sensing devices, such as those available from a wide range of manufacturers including IDEX ASA, Fujitsu, Atmel, Apple, Synaptics, Infineon, Sony, Integrated Biometrics, and Fingerprint Cards for example. Image arrays may be relatively small (e.g., 50×50 pixels, 128×128 pixels to a CIF size of 352×288 pixels or larger), each pixel having a pixel depth of but not limited to eight bits. System 100 uses a fingerprint image produced from device 105. In some cases, device 105 may preprocess images, such as performing image keystone corrections (a geometric correction used to account for optical distortions associated with optical/prism based systems when returning an image size proportionate to fingerprint size or image reconstruction to assemble an image taken in bands as a finger is 'swiped' across the sensor.

An operating system runs on processor 110, providing control and coordinating the functions of the various components of the system. The operating system may be one of the commercially available operating systems such as Microsoft (e.g., windows), Apple (e.g., IOS or Mac OS X), Google (e.g., Chrome or Android), as well as UNIX and AIX operating systems, though some embodiments may use a custom control for providing minimal, tailored functions. Custom programs, controlled by the system, include sets of instructions executable on processor 110 that are moved into and out of memory. These sets of instructions, when executed by processor 110, perform the methods and automated machine-implemented processes described herein. Device 105, I/O communication system 115, and memory system 130 are each coupled to processor 110 via a bus and with memory system 130 including a Basic Input/Output System (BIOS) for controlling the basic system functions.

I/O system 115 interconnects system 100 with outside devices or networks, enabling the system to communicate with other such systems over a communications system (e.g., directly wired, Local Area Network (LAN) or Wide Area Network (WAN), which includes, for example, the Internet, the WEB, intranets, extranets, and other public and private networks, wired, optical, or wireless). The terms associated with the communications system are meant to be generally interchangeable and are so used in the present description of the distribution network. I/O devices may also be connected to the system bus via I/O system 115. A keyboard, a pointing device (e.g., mouse, trackball or other device) and a display or indicator may be interconnected to system 100 through I/O system 115. It is through such input devices that the user may interactively relate to the programs for manipulating the resources, images, subsystems, processes and system according to the present invention. By using the aforementioned I/O devices, a user is capable of inputting information to the system through the keyboard or mouse and receiving output information from the system. The system may contain a removable memory component for transferring data, for example images, maps, instructions, or programs.

In use, system 100 processes a set of pattern images from a pattern source (e.g., a fingerprint) to reconstruct an image of the pattern source. Optionally, system 100 provides the user with feedback regarding a status and/or quality of the image reconstruction to aid in realtime impression gathering.

I/O system 115 may optionally include a display, other output or a visualization/audiblization system that supports a visualization graphic derived from a reconstruction image or provides some other indication or signal to the user. For example, as the user adds a new image to the set of images, each time the reconstruction image is enhanced by the addition of the new image, the visualization graphic is updated to illustrate the newly added information. For security, it may be desirable that the visualization graphic derived from the reconstruction image is degraded in some fashion (e.g., resolution) so that a true copy of the fingerprint is not on the display. Similarly, any image that is not immediately added to the reconstruction image may result in some other indication (e.g., tone) or temporary visual element on the display signaling that the image was not added.

In general, operation may include a trusted registration of a trusted template having template elements with trusted pattern elements from one or more trusted pattern representations of a pattern (e.g., a fingerprint from one finger of a user) made available in a trusted memory. One or more of these trusted pattern elements will include a set of evolvable seeds, minimum of one but preferably more than one. During use, as the fingerprint system is operated, new impressions are received from a fingerprint-under-test, some of which may be of the same finger from the same user. Various rules are employed to select and evolve one or more of the evolvable seeds to add new pattern information to the seed to have include additional new information. In the incorporated patent applications, there are specific examples of enhancing a foundation image which may be employed with evolving the seeds, though other systems and methods may also be employed. The specifics of how new pattern information is used to evolve a seed are varied. What is important is that the trusted evolvable seed(s), received during the trusted registration mode, may be evolved by new semi-trusted pattern information, e.g., fingerprint information from a fingerprint-under-test that matches or correlates to the trusted fingerprint, received during dynamic mode of operation. By having select new dynamic pattern information evolve the seeds by matching or correlating (using other dynamic information stored in memory), the template itself evolves and adapts to the user. Embodiments are not required to have independent authentication systems as the matching/correlating to trusted evolvable seeds inherently includes an innate authentication system. Some embodiments may include a secondary authentication system, and some embodiments may allow for later trusted registration of one or more new evolvable seeds. This later trusted registration may arise from intentional selection of a trusted registration mode for the device, or there may be an implicit selection of the trusted registration mode based upon a predetermined selection criteria. As the trusted template includes the template elements with the evolved seeds, the template may become more robust and secure over time.

During use, any particular image may serve as an intermediate bridging image that creates a correlation chain between images of an evolvable seed image and other stored images. When this happens, multiple images may be blended into the evolved seed image.

Figure 2:
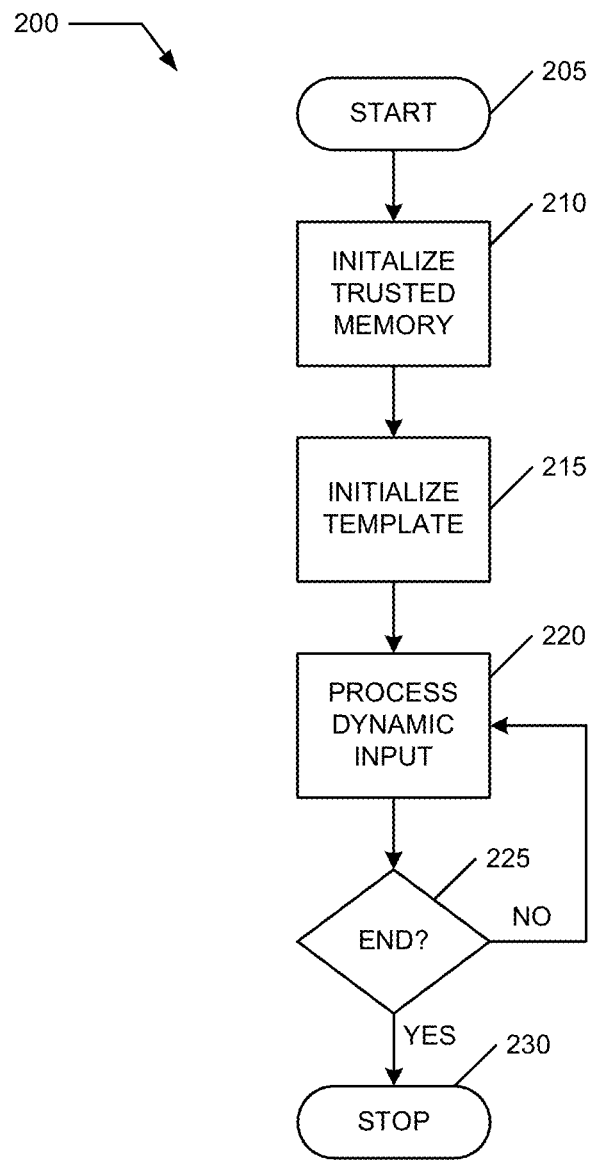
FIG. 2 illustrates a flow diagram of an embodiment for a semi-trusted dynamic registration process used in a pattern verification system.

FIG. 2 illustrates a flow diagram of an embodiment for a semi-trusted dynamic registration process 200 used in a pattern verification system. Process 200, executed by system 100 for example, includes a series of steps 205-230. Process 200 begins at start step 205 which includes a realtime implementation with step 205 accessing an imager wherein a set of images are received in sequence, such as from serial impressions of a finger on a fingerprint sensor. Alternatively, there may be a previously constructed storage of the set of images, and start 205 accesses the storage. After start step 205, process 200 includes an initialize trusted memory step 210 for operating with a trusted memory. Step 210 initializes the trusted memory where a trusted template is stored with information from a trusted pattern (e.g., a representation of a trusted fingerprint). For example, step 210 may clear the trusted memory and delete the current trusted template and start anew resetting the trusted template to a null state.

After step 210, process 200 includes an initialize template step 215 which defines a set of template elements for the template stored in the trusted memory. Step 215 includes a variation of a traditional initial registration process in which the device is placed into a trusted mode and the impressioner (e.g., fingerprint sensor) collects one or more impressions (e.g., images) of a portion of any fingerprint that actuates the impressioner. For many systems, it is preferred that the impressions are all from the same trusted finger of the same trusted user during this initial trusted registration mode. These impressions are used to define the initial state of the template elements of the template to be used with the device. Once the initial trusted registration mode is completed, the mode is changed to a semi-trusted dynamic mode for operation. Step 215 contemplates that initialization of the trusted template is not limited to an explicit initial trusted registration mode as it may be defined in other contexts as well as an explicit initial trusted registration mode.

Step 215 includes defining one or more evolvable seeds as template elements of this initial trusted template. For example, process 200 may desire to define N number, N a positive integer of 1 or greater (e.g., N∈{1, 2, 3, . . . 9} and integer multiples of N such as 2, 3, 4, 5, 6, 7, 8, 9, 10, or more times N. For purposes of this example, N=8, while other embodiments may preferably include N=15-20 evolvable seeds, while other embodiments may have some other value as described herein. In some implementations, step 215 collects at least these N=8 seeds from 8 or more initial images of a trusted fingerprint from the fingerprint sensor. However, in some embodiments, these N=8 seeds may be identified from fewer than 8 initial images taken during step 215. For example, in an event that step 215 collects 4 initial images, these 4 images may be used to define the N evolvable seeds such as by replicating/copying each initial image twice. Some implementations may define these the N evolvable seeds in a different manner from these initial images. At a minimum, one image may be received during step 215 used to define all the N evolvable seeds such as by replicating that one image N times. In some implementations, there may be value to intentionally including replicated images used for evolvable seeds even in cases when the system collects a desired number of images that could be used to make all the evolvable seeds unique.

These N number evolvable seeds are all trusted template elements of the trusted template initialized during step 215. The trusted template may include other template elements as well depending upon details of how the template and its template elements will be used during subsequent operation. Typically a template will include one or more complex template elements each formed from multiple individual images. The specific manner of their formation is implementation-dependent, details of which are not central to the present invention except that each of the N evolvable seeds are anticipated to be candidates to dynamically evolve into complex template elements consistent with the implementation specifics. Once the initial trusted template is initialized as desired to include the N number of evolvable seeds, step 215 concludes.

Traditionally the initial trusted registration process could require a significant number of images to be collected in order to define the trusted template elements with sufficient information to achieve a desired level of operational security for the initial trusted template or to collect enough pattern information for subsequent matching. Step 215 contemplates that many fewer number of images are added into the trusted template as template elements during step 215 than traditionally required. This has the advantage of speed and limits a time that the user spends during initial trusted registration. There is a potential cost in that the resulting trusted template may not initially have a desired level of security or a sufficient region of the trusted finger mapped to offer reasonable matching. Process 200 may address that by selectively evolving the evolvable seeds over time to improve the trusted template in response to new information obtained from the fingerprint sensor as each new image of a portion of a fingerprint-under-test is tested against the trusted template.

As noted above, step 215 is not required to be part of an explicit trusted registration mode. In addition to a possibility of being included as part of an explicit mode, such as may be deployed upon powering up a brand new device or after having reset a device to factory defaults, there are other opportunities for a non-explicit trusted registration of the initial trusted template. For example, a brand new device, or one powering up after a factory or user reset, may simply collect a first set of images to define the trusted template with an expectation that the person first using the device under these conditions is the authorized trusted user. Other situations in addition to these may define other conditions to automatically collect images and define the initial template for step 215.

After step 215, process 200 then includes a process dynamic input step 220. Step 220 responds to receipt of impressions of a pattern-under-test, or more typically impressions of a portion of the pattern-under-test, collected by a device during the dynamic mode of use. These received impressions may be used to possibly evolve one or more evolvable seeds. Evolution of an evolvable seed includes adding new pattern information from pattern information received in dynamic mode after the trusted template is initialized. An evolvable seed is evolved when information that has been received during dynamic mode is either matched or correlated to the evolvable seed. Any matching or correlating information is used to "build out" a selected evolvable seed with the matching or correlating information. For a case when a device is used by a single person who always employs a single finger, each received image during the dynamic mode has an increased probability of matching or correlating to one or more of the evolvable seeds. As a device includes more users and/or the users of a device apply more fingers to a fingerprint sensor, any received image during the dynamic mode has a decreased probability of matching or correlating to an evolvable seed.

Step 220 is able to evolve each evolvable seed and have it included as part of the trusted template because the evolvable seed was collected during a trusted mode and is anticipated to be a legitimate image of a trusted fingerprint from the authentic user. Thus no controls or passwords are required to add new dynamic information into the trusted template (though some systems may optionally employ such a feature).

A further option for step 220 is that a quality of each evolvable seed may be measured, determined, and/or evaluated (such as image size or other metric) and compared against a threshold or compared against one or more regions of other evolvable seeds (as the evolvable seeds should all evolve towards a single pattern). When the metric for an evolved evolvable seed exceeds the threshold condition, the evolvable seed may be locked and marked for non-evolution. A non-evolution status means that the associated seed is no longer evolvable unless/until the status is changed to evolvable.

During step 220, one consideration relates to how quickly it is desired to dynamically evolve the trusted template. At one end of a spectrum for speed of evolution, each newly received dynamic impression may, at most, evolve a single evolvable seed. At another end of this spectrum, each dynamic impression may evolve multiple, to all, evolvable seeds. In some cases, factors and parameters influencing the speed of evolution could be a user configurable parameter or preset by the manufacturer. As noted in one of the incorporated patent applications, an order in which a set of matching/correlating images are used to build out a more complex image composite can result in different, though closely equivalent images. So even in a case where multiple evolvable seeds are all replicated from a single trusted image, an order by which the same dynamic information is applied to build out those evolvable seeds can result in slightly different evolved seeds which can improve the robustness of an evolved trusted template including such a set of evolved seeds. Further, the system may have a metric to decide which evolvable seed(s) to evolve in response to information received during the dynamic mode, which may also be user and/or manufacturer controlled or influenced. For example, a new image would be added to better developed seeds. Alternatively, process 200 could also look at the percentage overlap versus new information that adding a new image would provide to each evolvable seed and use that to decide which seeds to evolve (that is, evolve those seeds where new information improves an evolvable seed the most).

For some applications, it may be desired that the trusted template evolve over an extended period (e.g., years). This may particularly be the case when a trusted template may be exchanged with other devices, such as newer, replacement device, though other applications may also benefit from an extended evolution scope. In some cases, it may be desirable that evolvable seeds be held in reserve and not subjected to evolution until sometime after the initial trusted template is defined. In some cases, an embedded device may not reliably have knowledge of elapsed time, thus a substitute to estimating an elapsed time is to rely on a number of images received by the system. For example, if on average a device receives 100 images per month, a device may estimate that 6 months' time has elapsed after 600 images have been received. Thus after a predetermined time, evolvable seeds that had been held in reserved and marked as non-evolvable may have their status change and become marked with an evolvable status and thereafter subject to evolution by incoming information received during the dynamic mode.

In other cases, in addition to or in lieu of selective unlocking of reserved seeds, some embodiments may selectively collect and add new seeds into a trusted template. A device may periodically (e.g., every six months) ask that a verified user register one or more new evolvable seeds during a subsequent trusted registration mode. Alternatively or in addition, a device may learn from a user certain locations and conditions when it may be more likely that a user is operating a device (for example, when a GPS system indicates that the user is home and the time-of-day indicates that a person using the device at home is most likely the user). When enough of the qualifications are in place, some implementations may collect new evolvable seeds for the trusted template or it is only during these times that the device accepts dynamic data to evolve an evolvable seed.

Step 220 may include other filters to preselect or limit dynamic impressions to be used in the evolution of one or more evolvable seeds. In addition to an option based on location and/or time-of-day, a device may include a counter to drop some image information received during dynamic mode. For example, in an application where it is contemplated a device may have multiple different users, dropping every $M^{th}$ image where M is 1, 2, 3, 4, 5 or more, reduces a chance that any random non-user operating a device will evolve an evolvable seed. The only impact on the authorized user is that it may take longer to evolve the evolvable seeds as their information is also being dropped.

In some cases, a device may randomly determine how many images to drop during dynamic mode until a next accepted image is processed. In these cases, the period may be consistent between each accepted image, or variable between each instance when an image is accepted.

After step 220, process 200 includes an end test step 225 that tests whether the dynamic evolution of the trusted template should terminate. When the test at step 225 is NO, process 200 branches back to step 220 to continue to process new image information during the dynamic mode and evolve one or more evolvable seeds with matching/correlating information. When the step 225 is YES, process 200 branches to an end step 230. For example, when all evolvable seeds have sufficiently evolved and exceeded any metric, process 200 may stop at step 230.

Figure 3:
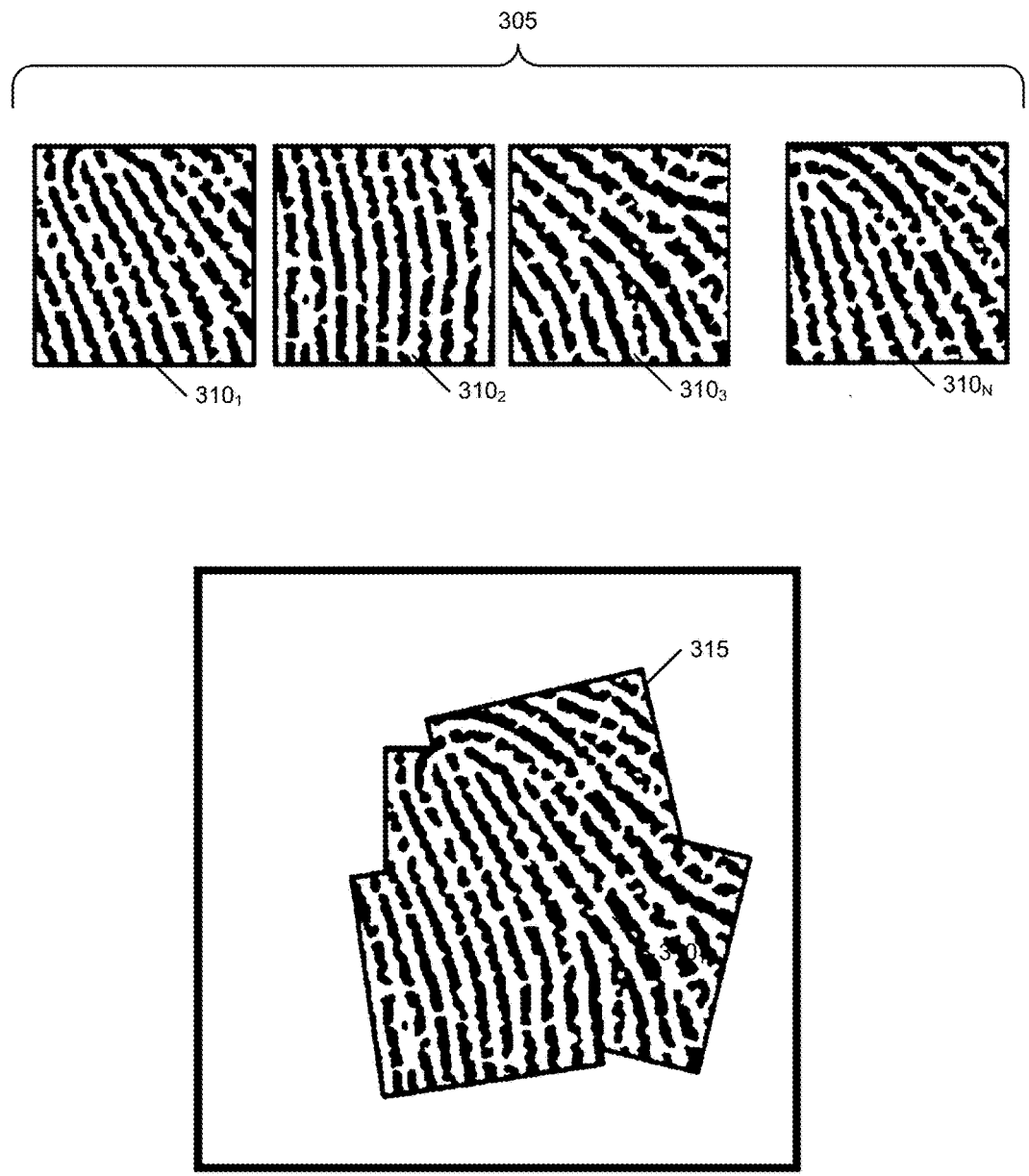
FIG. 3 illustrates a set 305 of evolvable seed images $310_x$, x=1 to N.

FIG. 3 illustrates a set 305 of evolvable seed images $310_x$, x=1 to N. The seed images each represent the result of an impression taken from an imager, such as a portion of a fingerprint sampled from a small fingerprint scanner. Also included in FIG. 3 is a representation of an evolved seed 315 that could be produced during dynamic mode operation. In FIG. 3, for convenience only one evolvable seed is shown evolved. In practice, it is likely that after time multiple seeds will be in differing stages of evolution and all of the evolvable seeds may be converging in different ways towards the same trusted pattern.

An embodiment may be compatible with user cases where the trusted registration mode is carried out by connecting the device containing the fingerprint sensor to another intelligent system, for example: a) a bank card, smart card or identity card containing a fingerprint sensor where trusted registration mode is carried out in a secure office with the card containing the fingerprint sensor possibly linked to a computer and supervised by an official, and b) a device containing a fingerprint sensor that does not have any kind of graphical user interface/screen/user feedback mechanism is connected to a computer/mobile phone/portable electronic device during trusted registration mode, among other possible uses. Moreover, those skilled in the art will appreciate that the above described methods may be practiced using any one or a combination of computer processing system configurations, including, but not limited to, single and multi-processor systems, hand-held devices, programmable consumer electronics, mini-computers, or mainframe computers. The above described methods may also be practiced in distributed computing environments where tasks are performed by servers or other processing devices that are linked through a one or more data communications networks. In a distributed computing environment, program modules may be located in both local and remote computer storage media including memory storage devices.

Also, an article of manufacture for use with a computer processor, such as a CD, pre-recorded disk or other equivalent devices, could include a computer program storage medium and program mechanisms recorded thereon for directing the computer processor to facilitate the implementation and practice of the above described methods. Such devices and articles of manufacture also fall within the spirit and scope of the present invention.

The invention can be implemented in numerous ways, including for example as a method (including a computer-implemented method), a system (including a computer processing system, general purpose, special purpose, hybrid, embedded, and the like), an apparatus, a computer readable medium, a computer program product, a graphical user interface, a web portal, or a data structure tangibly fixed in a computer readable memory. Several embodiments of the present invention are discussed herein. The appended drawings illustrate only typical embodiments of the present invention and therefore are not to be considered limiting of its scope and breadth. The system, methods, and computer-program products have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

System 100 includes a computer program product or software that is stored on or in a non-transitory processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, and a fiber optic medium. As will be described more fully herein, the software can include a plurality of modules for performing system tasks such as performing the methods previously described herein. A processor interprets instructions to execute the software, as well as, generates automatic instructions to execute software for system responsive to predetermined conditions. Instructions from both the user interface and the software are processed by the processor for operation of system 100. In some embodiments, a plurality of processors can be utilized such that system operations can be executed more rapidly.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A machine-implemented method for evolving a trusted template using a set of post-registration information, the trusted template including a set of trusted template elements defined from a pattern with the set of trusted template elements, the method comprising:
   a) defining, during a trusted mode, a set of evolvable seeds from the pattern, said set of evolvable seeds including at least two evolvable seeds, each said evolvable seed having an initial area including an initial portion of the pattern;
   b) including said set of evolvable seeds in the set of trusted template elements;
   c) applying, during a semi-trusted mode, a metric to choose which evolvable seeds to evolve from said set of evolvable seeds; and
   d) evolving, during the semi-trusted mode, the chosen evolvable seeds of said set of evolvable seeds responsive to the set of post-registration information with each evolvable seed producing an evolved seed dependent on an order in which the post registration information is applied to that evolvable seed, each particular said evolved seed having a particular evolved area larger than said initial area of said particular evolvable seed, said evolved area including an additional portion of the pattern not included in said initial area of said particular evolvable seed.

2. The method of claim 1 wherein said evolving step d) includes:
   d1) collecting, during said semi-trusted mode, a series of pattern impressions from a pattern-under-test to be tested against the trusted template for verification that said pattern-under-test matches to the pattern; and
   d2) updating one of or more of said evolvable seeds responsive to at least one particular pattern impression of said series of pattern impressions when said particular pattern impression is verifiable against the trusted template.

3. The method of claim 1 wherein said set of evolvable seeds defined in said defining step a) includes an initial set of evolvable seeds, the method further comprising:
   e) detecting a situation of trust other than an explicit trusted mode registration; and
   f) defining one or more additional evolvable seeds during said situation of trust as an additional set of evolvable seeds; and
   g) adding said additional set of evolvable seeds into said set of evolvable seeds as part of the set of trusted elements.

4. The method of claim 3 wherein said initial set of evolvable seeds includes a first status indication, wherein said additional set of evolvable seeds include a second status indication different from said first status indication, and wherein said evolving step d) evolves evolvable seeds of said set of evolvable seeds responsive to said status indication.

5. The method of claim 3 wherein said situation of trust is detected from a situation group consisting essentially of operation at a trusted location, a pattern of a user behavior, and combinations thereof.

6. The method of claim 1 wherein said set of evolvable seeds includes a number N evolvable seeds, preferably with N greater than or equal to 8, and more preferably with N in a range of 15-20.

7. The method of claim 6 wherein said number N evolvable seeds are unique evolvable seeds.

8. The method of claim 6 wherein said number N evolvable seeds includes one or more replicated evolvable seeds wherein a number of unique evolvable seeds is fewer than said number N.

9. The method of claim 1 wherein said evolving step d) further comprises:
   d1) establishing, for each evolvable seed as it is evolved into an evolved seed, a quality metric representing a state of evolution for said evolved seed.

10. The method of claim 9 wherein an evolved seed includes an image of a portion of the pattern and wherein said quality metric includes an image size for said portion of the pattern represented by said evolved seed.

11. The method of claim 9, further comprising:
   e) locking each said evolved seed when said quality metric exceeds a threshold condition producing a locked evolved seed wherein each said locked evolved seed is not further evolved by said evolving step d) responsive to the set of post-registration information.

12. The method of claim 11, further comprising:
   f) unlocking a locked evolved seed producing an unlocked evolved evolvable seed wherein each said unlocked evolved evolvable seed is available for evolution by said evolving step d) responsive to the set of post-registration information.

13. The method of claim 1 wherein said evolving step d) selects and evolves at most one evolvable seed of said set of evolvable seeds responsive to a particular post-registration information of the set of post-registration information.

14. The method of claim 1 wherein said evolving step d) selects and evolves more than one evolvable seed of said set of evolvable seeds responsive to a particular post-registration information of the set of post-registration information.

15. The method of claim 1 wherein said evolving step d) selects and evolves all said evolvable seeds of said set of evolvable seeds responsive to a particular post-registration information of the set of post-registration information.

16. The method of claim 1 wherein said evolving step d) selects and evolves a number X of said evolvable seeds of said set of evolvable seeds responsive to a particular post-registration information of the set of post-registration information and wherein said number X is responsive to a configuration option.

17. The method of claim 1 wherein said set of evolvable seeds defined in said defining step a) includes an initial set of evolvable seeds, the method further comprising:
   e) partitioning said initial set of evolvable seeds into an active group and a reserve group, said reserve group including at least one evolvable seed of said set of evolvable seeds; and
   f) selecting only evolvable seeds in said active group for operation by said step d); and
   g) transferring, responsive to a transfer condition, one or more evolvable seeds from said reserve group to said active group.

18. The method of claim 17 wherein each evolution of an evolvable seed by step d) increases a counter C and wherein said transfer condition includes a comparison of said counter C against a predetermined metric.

19. The method of claim 1 wherein production of each particular post-registration information of the set of post-registration information processed by step d) increases a counter C and wherein said evolving step d) selectively processes, responsive to said counter C, a processed subset of the set of post-registration information for evolution wherein said processed subset includes less than all post-registration information of the set of post-registration information.

20. The method of claim 19 wherein said evolving step d) does not process every $M^{th}$ particular post-registration information for evolution of an evolvable seed, wherein M=2, 3, 4, 5, 6, 7, 8, or more.

21. A machine-implemented method for evolving a trusted template using a set of post-registration information, the trusted template including a set of trusted template elements defined from a pattern with the set of trusted template elements, the method comprising:
   a) defining, during a trusted mode, a set of evolvable seeds from the pattern, said set of evolvable seeds including at least one evolvable seed;
   b) including said set of evolvable seeds in the set of trusted template elements; and
   c) evolving, during a semi-trusted mode, one or more evolvable seeds of said set of evolvable seeds responsive to the set of post-registration information; wherein production of each particular post-registration information of the set of post-registration information processed by step c) increases a counter C and wherein said evolving step c) selectively processes, responsive to said counter C, a processed subset of the set of post-registration information for evolution wherein said processed subset includes less than all post-registration information of the set of post-registration information wherein said evolving step c) does not process every $M^{th}$ particular post-registration information for evolution of an evolvable seed, wherein M includes a randomly chosen constant value consistent over said processed subset.

22. The method of claim 19 wherein said evolving step d) does not process every $M^{th}$ particular post-registration information for evolution of an evolvable seed, wherein M includes a varying random value over said processed subset.

23. The method of claim 1 wherein said steps a)-d) are performed by two discrete processing systems including a first trusted processing system performing said step d) and a second semi-trusted processing system both receiving said set of evolvable seeds from said first trusted processing system and performing said steps b)-d).

24. The method of claim 23 wherein said second semi-trusted processing system is selected from one or more devices of a device group consisting essentially of a portable electronic device, a smart phone, a smart card, a device having a pattern impressioner without other graphical user interface/screen/user-feedback-mechanism, and combinations thereof.

25. An apparatus for evolving a trusted template using a set of post-registration information, the trusted template including a set of trusted template elements defined from a pattern with the set of trusted template elements used for a later verification of the pattern, comprising:
   a pattern impressioner producing one or more impressions of one or more portions of the pattern; and
   a processing system, coupled to said pattern source, including a processor and a memory coupled to said processor, said memory storing a plurality of computer executable instructions wherein said processor executes said plurality of computer executable instructions to perform a method, comprising:
   a) defining, during a trusted mode, a set of evolvable seeds from the biometric pattern, said set of evolvable seeds including at least two evolvable seeds, each said evolvable seed having an initial area including an initial portion of the pattern;
   b) including said set of evolvable seeds in the set of trusted elements; and thereafter
   c) applying, during a semi-trusted mode, a metric to choose which evolvable seeds to evolve from said set of evolvable seeds; and
   d) evolving, during the semi-trusted mode, the chosen evolvable seeds of said set of evolvable seeds responsive to the set of post-registration information with each evolvable seed producing an evolved seed dependent on an order in which the post registration information is applied to that evolvable seed, each particular said evolved seed having a particular evolved area larger than said initial area of said particular evolved seed, said evolved area including an additional portion of the pattern not included in said initial area of said particular evolvable seed.

26. A non-transitory computer readable medium with computer executable instructions stored thereon executed by a processor to perform the method of dynamically evolving a trusted template using a set of post-registration information, the trusted template including a set of trusted template elements defined from a pattern with the set of trusted template elements used for verification of the pattern, the method comprising:
   a) defining, during a trusted mode, a set of evolvable seeds from the pattern, said set of evolvable seeds including at least two evolvable seeds, each said evolvable seed having an initial area including an initial portion of the pattern;

b) including said set of evolvable seeds in the set of trusted elements; and thereafter c) applying, during a semi-trusted mode, a metric to choose which evolvable seeds to evolve from said set of evolvable seeds; and d) evolving, during the semi-trusted mode, the chosen evolvable seeds of said set of evolvable seeds responsive to the set of post-registration information with each evolvable seed producing an evolved seed dependent on an order in which the post registration information is applied to that evolvable seed, each particular said evolved seed having a particular evolved area larger than said initial area of said particular evolved seed, said evolved area including an additional portion of the pattern not included in said initial area of said particular evolvable seed.

* * * * *